US006941478B2

(12) United States Patent
Card et al.

(10) Patent No.: US 6,941,478 B2
(45) Date of Patent: Sep. 6, 2005

(54) SYSTEM AND METHOD FOR PROVIDING EXPLOIT PROTECTION WITH MESSAGE TRACKING

(75) Inventors: James Card, Nashua, NH (US); Gregory J. Smith, Santa Clara, CA (US)

(73) Assignee: Nokia, Inc., Irvine, TX (US)

( * ) Notice: Subject to any disclaimer, the term of this patent is extended or adjusted under 35 U.S.C. 154(b) by 249 days.

(21) Appl. No.: 10/317,296

(22) Filed: Dec. 11, 2002

(65) Prior Publication Data

US 2003/0088792 A1 May 8, 2003

Related U.S. Application Data

(63) Continuation-in-part of application No. 10/121,959, filed on Apr. 12, 2002.

(60) Provisional application No. 60/283,757, filed on Apr. 13, 2001.

(30) Foreign Application Priority Data

Apr. 11, 2002 (WO) ............................... PCT/US02/11656
Apr. 12, 2002 (WO) ............................... PCT/US02/11685

(51) Int. Cl.[7] .................................................. G06F 7/02

(52) U.S. Cl. ....................... 713/201; 713/201; 713/200; 713/164

(58) Field of Search ............................ 714/48; 713/201, 713/200, 164

(56) References Cited

U.S. PATENT DOCUMENTS 5,815,571 A 9/1998 Finley ........................... 380/4
5,832,208 A 11/1998 Chen et al. ............ 395/187.01
5,832,228 A 11/1998 Holden et al. ......... 395/200.55
5,870,610 A 2/1999 Beyda
5,987,610 A 11/1999 Franczek et al. ........... 713/200
6,205,551 B1 3/2001 Grosse ....................... 708/135
6,609,196 B1 * 8/2003 Dickinson et al. .......... 713/154
6,701,440 B1 * 3/2004 Kim et al. .................. 713/201

OTHER PUBLICATIONS

PCT/US02/11685; International Search Report; International Filing Date Apr. 12, 2002; 3 pages.

* cited by examiner

*Primary Examiner*—Gregory Morse
*Assistant Examiner*—Thomas Ho
(74) *Attorney, Agent, or Firm*—Darby & Darby P.C.; Jamie L. Wiegand

(57) ABSTRACT

A method and system for providing protection from exploits to devices connected to a network. The system and method include a component for determining whether an encapsulation has been applied to an attachment associated with a message and unencapsulating such encapsulated attachment, and a component that performs at least one decompression of the attachment when the attachment is compressed. If it is determined that the message, including the attachment, is to be scanned, a component is included that determines whether a header, body, and/or attachment of the message includes exploits. A device that receives messages that are directed to the network employs the components above to provide exploit protection for at least one of the messages.

17 Claims, 6 Drawing Sheets

SYSTEM AND METHOD FOR PROVIDING EXPLOIT PROTECTION WITH MESSAGE TRACKING

RELATED APPLICATION

This utility patent application is a continuation-in-part of U.S. patent application Ser. No. 10/121,959, filed Apr. 12, 2002, of which the benefit of the earlier filing date is hereby claimed under 35 U.S.C. §120, which in turn is based on a previously filed U.S. Provisional Patent application, U.S. Ser. No. 60/283,757 filed on Apr. 13, 2001, the benefit of the filing date of which is hereby claimed under 35 U.S.C. §119(e), each of which is hereby incorporated by reference.

FIELD OF THE INVENTION

The present invention relates to computer network security, and in particular to exploit protection for networks.

BACKGROUND

The Internet connects millions of nodes located around the world. With the click of a button, a user in one part of the world can access a file on another computer thousands of miles away. In addition, the Internet has facilitated the exchange of information in the form of electronic messages known as email. Although, first used to transfer short text messages, email can now be used to send digital pictures, sound files, documents, spreadsheets, executable programs, and other electronic files. Sending such files can be easy as attaching them to an email message and clicking a send button.

Due in part to the ease of transmitting information, there has been exploitation of the technology for unintended purposes. One of the first well-publicized cases of exploitation involved using email servers to propagate a program. Once an email server became "infected" with the program, it would send email messages containing the program to other email servers that it was aware of. Like a virus, the program spread from email server to email server with amazing speed. Although the program did not erase files or harm data on the email servers, because of the volume of email messages sent by the infected email servers, the program caused retrieval of email messages from email servers to slow to an excruciating pace.

Now, the news reports virus-like programs (hereinafter "exploits") on an almost daily basis. Some of these exploits are relatively benign; others destroy data or capture sensitive information. Unless properly protected against, these exploits can bring a company's network or email system to its knees or steal sensitive information, even if only a few computers are infected.

The most prevalent method for dealing with these exploits is to install virus protection software on every computer. As soon as a version of virus protection software is released, those seeking to circumvent the exploit protection software create new exploits that are not recognized by the virus protection software. This prompts virus protection software developers to create updates for their virus protection software to detect these new exploits. Previously, updating the virus protection software on each computer required obtaining the updates on disk and individually installing the update. Now, virus protection software allows computer users to download updates using the Internet. Since installing updates requires effort on the part of each user (or a computer support team), quite often the virus protection software is not brought up-to-date on every computer. In addition, there is often a significant delay between the introduction of a new virus and the creation and distribution of an update aimed to protect against the new virus. Additionally, virus protection software typically does not protect against the more general class of virus-like programs known as exploits.

SUMMARY

In accordance with the present invention, there is provided a method and system for providing protection from exploits to devices connected to a network. The system includes a message tracker that is configured to determine whether a message is an unscanned message, and a component that determines whether a header, body, and/or attachment of an unscanned message includes an exploit.

In a further aspect of the invention, a first value is associated with the message. If the first value approximately matches a second value, the message is identified as a scanned message. The second value may be stored in a table, database, or a list.

In another aspect of the invention, a client executing on the system determines when an update is available by polling servers associated with vendors of exploit protection software. When the client determines that an update is available, it automatically retrieves the update. Moreover, the second value is set to a nullity when the scanner component is updated.

In another aspect of the invention, a method is directed to providing protection from exploits to devices connected to a network. A message is received at a node that receives messages that are directed to any of the devices. The message includes a header and at least one of a body and an attachment. If the message is an unscanned message, the method determines if at least one of the header and the body includes the exploit. If at least one of the header, body, and attachment of the message includes the exploit, the method includes quarantining the message.

These and various other features as well as advantages, which characterize the present invention, will be apparent from a reading of the following detailed description and a review of the associated drawings.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first definitions of some terms that are used throughout this document are given. Then, illustrative components of an illustrative operating environment in which the invention may be practiced is disclosed. Next, an illustrative operating environment in which the invention may be practiced is disclosed. Finally, a method of detecting and removing exploits is provided.

Definitions

The definitions in this section apply to this document, unless the context clearly indicates otherwise. The phrase "this document" means the specification, claims, and abstract of this application.

"Including" means including but not limited to. Thus, a list including A is not precluded from including B.

A "packet" refers to an arbitrary or selectable amount of data, which may be represented by a sequence of one or more bits. A packet may correspond to a data unit found in any layer of the Open Systems Interconnect (OSI) model, such as a segment, message, packet, datagram, frame, symbol stream, or stream, a combination of data units found in the OSI model, or a non OSI data unit.

Figure 3:
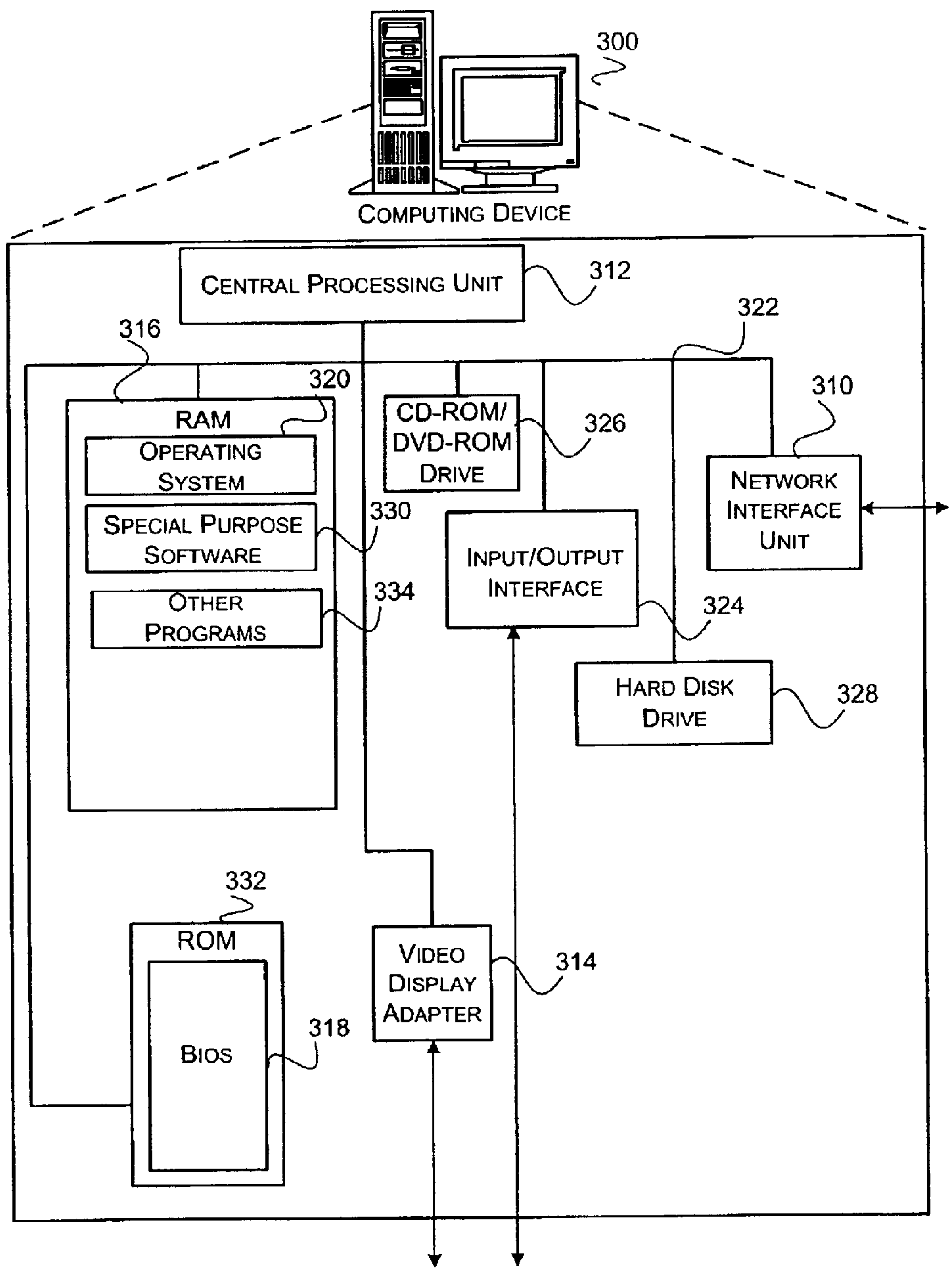

"Client" refers to a process or set of processes that execute on one or more electronic devices, such as computing device 300 of FIG. 3. A client is not constrained to run on a workstation; it may also run on a server such as a WWW server, file server, or other server, other computing device, or be distributed over a group of such devices. Where appropriate, the term "client" should be construed, in addition or in lieu of the definition above, to be a device or devices upon which one or more client processes execute, for example, a computing device, such as computing device 300, configured to function as a World Wide Web (WWW) server, a computing device configured as a router, gateway, workstation, etc.

Similarly, "server" refers to a process or set of processes that execute on one or more electronic devices, such as computing device 300 configured as a WWW server. Like a client, a server is not limited to running on a computing device that is configured to predominantly provide services to other computing devices. Rather, it may also execute on what would typically be considered a client computer, such as computing device 300 configured as a user's workstation, or be distributed among various electronic devices, wherein each device might include one or more processes that together constitute a server application. Where appropriate, the term "server" should be construed, in addition or in lieu of the definition above, to be a device or devices upon which one or more server processes execute, for example, a computing device configured to operate as a WWW server, router, gateway, workstation, etc.

An exploit is any procedure and/or software that may be used to improperly access a computer through email. Exploits include what are commonly known as computer viruses but may also include other methods for inappropriately gaining access to a computer. For example, computer viruses are typically included in an attachment to an email message. Some exploits, however, are contained in the header or body of an email message. For example, some exploits attempt to overflow buffers allotted for portions or all of a header or body of an email message. In bytes of data contained in the overflow, these exploits often contain executable code. This executable code is arranged in such a fashion as to be executed by the host computer. The executable code may then improperly access data and/or execute unauthorized programs on the host computer.

Referring to the drawings, like numbers indicate like parts throughout the figures and this document.

Definitions of terms are also found throughout this document. These definitions need not be introduced by using "means" or "refers" to language and may be introduced by example and/or function performed. Such definitions will also apply to this document, unless the context clearly indicates otherwise.

Illustrative Operating Environment

Figure 1:
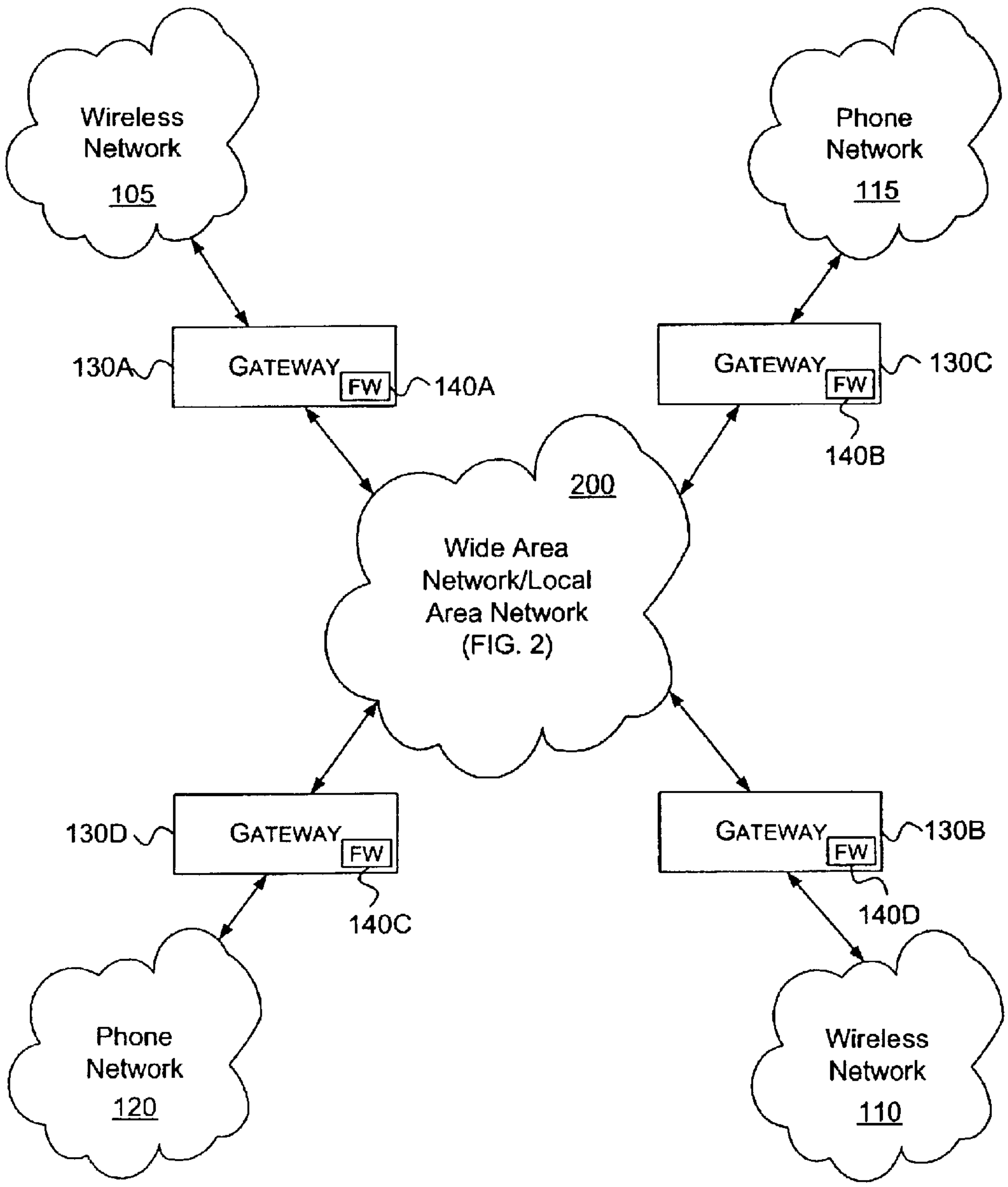
FIGS. 1–3 show components of an exemplary environment in which the invention may be practiced.
Figure 2:
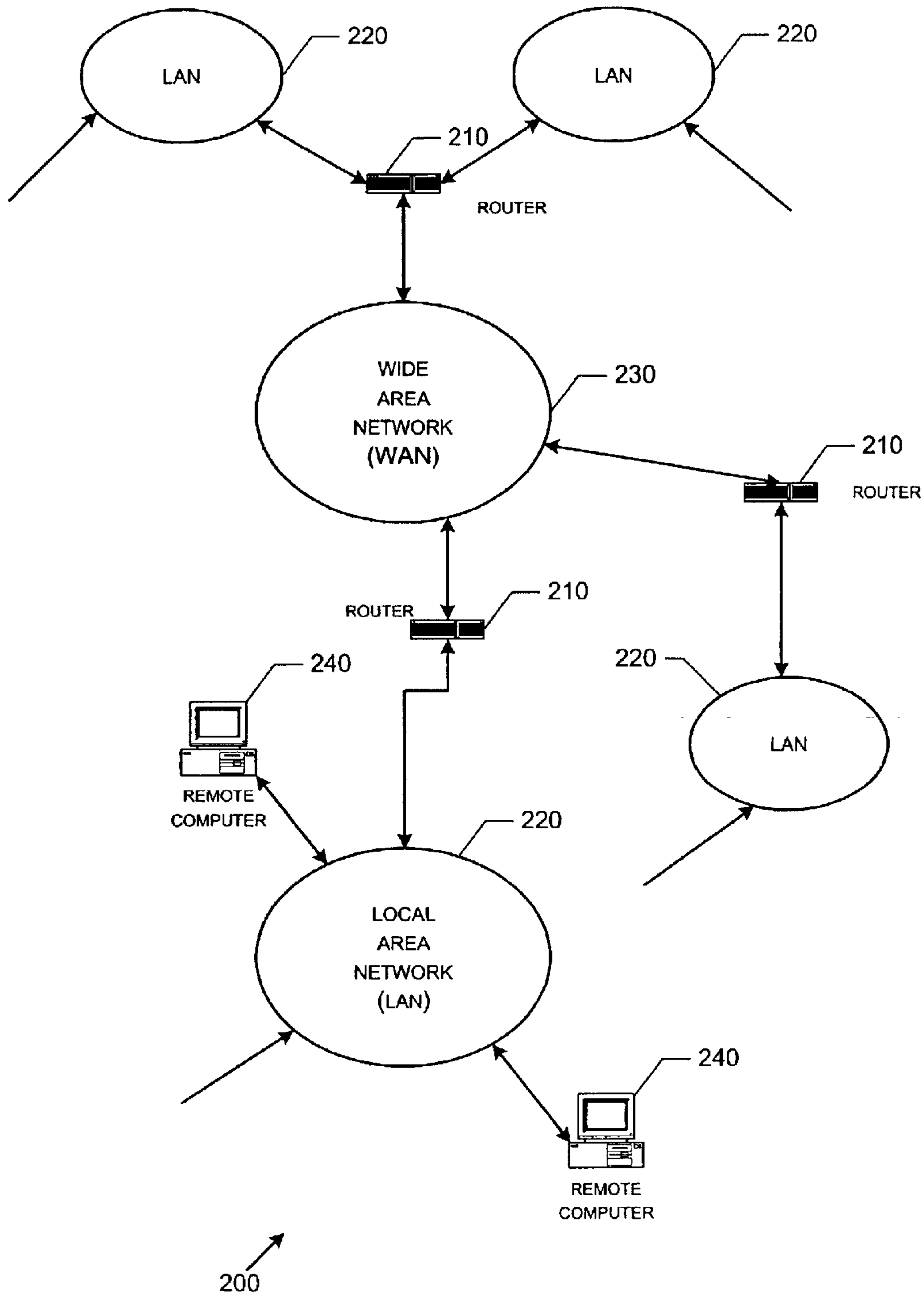

FIGS. 1–3 show components of an exemplary environment in which the invention may be practiced. Not all the components may be required to practice the invention, and variations in the arrangement and type of the components may be made without departing from the spirit or scope of the invention.

FIG. 1 shows wireless networks 105 and 110, telephone phone networks 115 and 120, interconnected through gateways 130A–130D, respectively, to wide area network/local area network 200. Gateways 130A–130D each optionally include a firewall component, such as firewalls 140A–140D, respectively. The letters FW in each of gateways 130A–130D stand for firewall.

Wireless networks 105 and 110 transports information and voice communications to and from devices capable of wireless communication, such as such as cell phones, smart phones, pagers, walkie talkies, radio frequency (RF) devices, infrared (IR) devices, CBs, integrated devices combining one or more of the preceding devices, and the like. Wireless networks 105 and 110 may also transport information to other devices that have interfaces to connect to wireless networks, such as a PDA, POCKET PC, wearable computer, personal computers, multiprocessor systems, microprocessor-based or programmable consumer electronics, network PCs, and other properly-equipped devices. Wireless networks 105 and 110 may include both wireless and wired components. For example, wireless network 110 may include a cellular tower (not shown) that is linked to a wired telephone network, such as telephone network 115. Typically, the cellular tower carries communication to and from cell phones, pagers, and other wireless devices, and the wired telephone network carries communication to regular phones, long-distance communication links, and the like.

Similarly phone networks 115 and 120 transport information and voice communications to and from devices capable of wired communications, such as regular phones and devices that include modems or some other interface to communicate with a phone network. A phone network, such as phone network 120, may also include both wireless and wired components. For example, a phone network may include microwave links, satellite links, radio links, and other wireless links to interconnect wired networks.

Gateways 130A–130D interconnect wireless networks 105 and 110 and telephone networks 115 and 120 to WAN/LAN 200. A gateway, such as gateway 130A, transmits data between networks, such as wireless network 105 and WAN/LAN 200. In transmitting data, the gateway may translate the data to a format appropriate for the receiving network. For example, a user using a wireless device may begin browsing the Internet by calling a certain number, tuning to a particular frequency, or selecting a browsing feature of the device. Upon receipt of information appropriately addressed or formatted, wireless network 105 may be configured to send data between the wireless device and gateway 130A. Gateway 130A may translate requests for web pages from the wireless device to hypertext transfer protocol (HTTP) messages which may then be sent to WAN/LAN 200.

Gateway 130A may then translate responses to such messages into a form compatible with the wireless device. Gateway 130A may also transform other messages sent from wireless devices into message suitable for WAN/LAN 200, such as email, voice communication, contact databases, calendars, appointments, and other messages.

Before or after translating the data in either direction, the gateway may pass the data through a firewall, such as firewall 140A, for security, filtering, or other reasons. A firewall, such as firewall 140A, may include or send messages to an exploit detector. Firewalls and their operation in the context of embodiments of the invention are described in more detail in conjunction with FIGS. 4–6. Briefly, a gateway may pass data through a firewall to determine whether it should forward the data to a receiving network. The firewall may pass some data, such as email messages, through an exploit detector, which may detect and remove exploits from the data. If data contains an exploit, the firewall may stop the data from passing through the gateway.

In other embodiments of the invention, exploit detectors are located on components separate from gateways and/or firewalls. For example, in some embodiments of the invention, an exploit detector may be included within a router inside a wireless network, such as wireless network 105, that receives messages directed to and coming from the wireless network, such as wireless network 105. This may negate or make redundant an exploit detector on a gateway between networks, such as gateway 130A. Ideally, exploit detectors are placed at ingress locations to a network so that all devices within the network are protected from exploits. Exploit detectors may, however, be located at other locations within a network, integrated with other devices such as switches, hubs, servers, routers, traffic managers, etc., or separate from such devices.

In another embodiment of the invention, an exploit detector is accessible from a device that seeks to provide exploit protection, such as a gateway. Accessible, in this context, may mean that exploit protector is physically located on the server or computing device implementing the gateway or that the exploit detector is on another server or computing device accessible from the gateway. In this embodiment, a gateway, may access the exploit detector through an application programming interface (API). Ideally, a device seeking exploit protection directs all messages through an associated exploit detector so that exploit detector is "logically" between the networks that the device interconnects. In some instances, a device may not send all messages through an exploit detector. For example, an exploit detector may be disabled or certain messages may be explicitly or implicitly designated to avoid the exploit detector.

Typically, WAN/LAN 200 transmits information between computing devices as described in more detail in conjunction with FIG. 2. One example of a WAN is the Internet, which connects millions of computers over a host of gateways, routers, switches, hubs, and the like. An example of a LAN is a network used to connect computers in a single office. A WAN may be used to connect multiple LANs.

It will be recognized that the distinctions between WANs/LANs, phone networks, and wireless networks are blurring. That is, each of these types of networks may include one or more portions that would logically belong to one or more other types of networks. For example, WAN/LAN 200 may include some analog or digital phone lines to transmit information between computing devices. Phone network 120 may include wireless components and packet-based components, such as voice over IP. Wireless network 105 may include wired components and/or packet-based components. Network means a WAN/LAN, phone network, wireless network, or any combination thereof.

FIG. 2 shows a plurality of local area networks ("LANs") 220 and wide area network ("WAN") 230 interconnected by routers 210. Routers 210 are intermediary devices on a communications network that expedite packet delivery. On a single network linking many computers through a mesh of possible connections, a router receives transmitted packets and forwards them to their correct destinations over available routes. On an interconnected set of LANs—including those based on differing architectures and protocols—, a router acts as a link between LANs, enabling packets to be sent from one to another. A router may be implemented using special purpose hardware, a computing device executing appropriate software, such as computing device 300 as described in conjunction with FIG. 3, or through any combination of the above.

Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 240, and other related electronic devices can be remotely connected to either LANs 220 or WAN 230 via a modem and temporary telephone link. The number of WANs, LANs, and routers in FIG. 2 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and packets. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send packets to other users via email by using links on the Web page.

A computing device that may provide a WWW site is described in more detail in conjunction with FIG. 3. When used to provide a WWW site, such a computing device is typically referred to as a WWW server. A WWW server is a computing device connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 3 shows a computing device. Such a device may be used, for example, as a server, workstation, network appliance, router, bridge, firewall, exploit detector, gateway, and/or as a traffic management device. When used to provide a WWW site, computing device 300 transmits WWW pages to the WWW browser application program executing on requesting devices to carry out this process. For instance, computing device 300 may transmit pages and forms for receiving information about a user, such as address, telephone number, billing information, credit card number, etc. Moreover, computing device 300 may transmit WWW pages to a requesting device that allows a consumer to participate in a WWW site. The transactions may take place over the Internet, WAN/LAN 100, or some other communications network known to those skilled in the art.

It will be appreciated that computing device 300 may include many more components than those shown in FIG. 3. However, the components shown are sufficient to disclose an illustrative environment for practicing the present invention. As shown in FIG. 3, computing device 300 may be connected to WAN/LAN 200, or other communications network, via network interface unit 310. Network interface unit 310 includes the necessary circuitry for connecting computing device 300 to WAN/LAN 200, and is constructed for use with various communication protocols including the TCP/IP protocol. Typically, network interface unit 310 is a card contained within computing device 300.

Computing device 300 also includes processing unit 312, video display adapter 314, and a mass memory, all connected via bus 322. The mass memory generally includes random access memory ("RAM") 316, read-only memory ("ROM") 332, and one or more permanent mass storage devices, such as hard disk drive 328, a tape drive (not shown), optical drive 326, such as a CD-ROM/DVD-ROM drive, and/or a floppy disk drive (not shown). The mass memory stores operating system 320 for controlling the operation of computing device 300. It will be appreciated that this component may comprise a general-purpose operating system including, for example, UNIX, LINUX™, or one produced by Microsoft Corporation of Redmond, Wash. Basic input/output system ("BIOS") 318 is also provided for controlling the low-level operation of computing device 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including special purpose software 330, and other programs 334. Special purpose software 330 may include a WWW server application program that includes computer executable instructions which, when executed by computing device 300, generate WWW browser displays, including performing the logic described above. Computing device 300 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Computing device 300 may also comprise input/output interface 324 for communicating with external devices, such as a mouse, keyboard, scanner, or other input devices not shown in FIG. 3. In some embodiments of the invention, computing device does not include user input/output components. For example, computing device 300 may or may not be connected to a monitor. In addition, computing device 300 may or may not have video display adapter 314 or input/output interface 324. For example, computing device 300 may implement a network appliance, such as a router, gateway, traffic management device, etc., that is connected to a network and that does not need to be directly connected to user input/output devices. Such a device may be accessible, for example, over a network.

Computing device 300 may further comprise additional mass storage facilities such as optical drive 326 and hard disk drive 328. Hard disk drive 328 is utilized by computing device 300 to store, among other things, application programs, databases, and program data used by a WWW server application executing on computing device 300. A WWW server application may be stored as special purpose software 330 and/or other programs 334. In addition, customer databases, product databases, image databases, and relational databases may also be stored in mass memory or in RAM 316.

As will be recognized from the discussion below, aspects of the invention may be embodied on routers 210, on computing device 300, on a gateway, on a firewall, on other devices, or on some combination of the above. For example, programming steps protecting against exploits may be contained in special purpose software 330 and/or other programs 334.

Exemplary Configuration of System to Protect from Exploits

Figure 4:
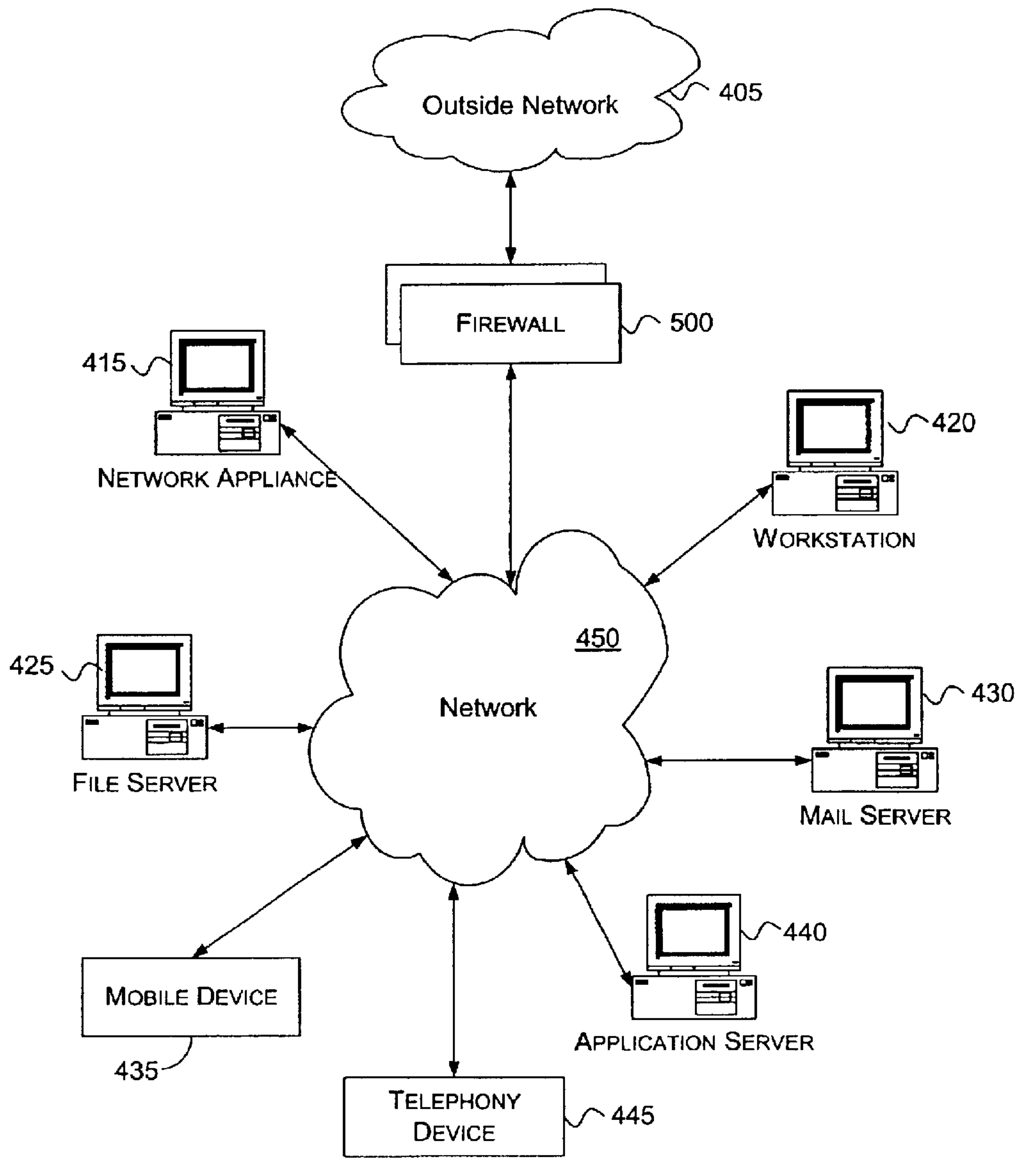
FIG. 4 illustrates an exemplary environment in which a system for providing exploit protection for a network operates.

FIG. 4 illustrates an exemplary environment in which a system for providing exploit protection for a network operates, according to one embodiment of the invention. The system includes outside network 405, firewall 500, network appliance 415, workstation 420, file server 425, mail server 430, mobile device 435 application server 440, telephony device 445, and network 450. Network 450 couples firewall 500 to network appliance 415, workstation 420, file server 425, mail server 430, mobile device 435, application server 440, and telephony device 445. Firewall 500 couples network 450 to outside network 405.

Network appliance 415, workstation 420, file server 425, mail server 430, mobile device 435, application server 440, and telephony device 445 are devices capable of connecting with network 450. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Some devices may be capable of connecting to network 450 using a wired or wireless communication medium such as a PDA, POCKET PC, wearable computer, or other device mentioned above that is equipped to use a wired and/or wireless communications medium. An exemplary device that may implement any of the devices above is computing device 300 of FIG. 3 configured with the appropriate hardware and/or software.

Network appliance 415 may be, for example, a router, switch, or some other network device. Workstation 420 may be a computer used by a user to access other computers and resource reachable through network 450, including outside network 405. File server 425 may, for example, provide access to mass storage devices. Mail server 430 may store and provide access to email messages. Mobile device 435 may be a cell phone, PDA, portable computer, or some other device used by a user to access resources reachable through network 450. Application server 440 may store and provide access to applications, such as database applications, accounting applications, etc. Telephony device 445 may provide means for transmitting voice, fax, and other messages over network 450. Each of these devices may represent many other devices capable of connecting with network 450 without departing from the spirit or scope of the invention.

Outside network 405 and Network 450 are networks as previously defined in this document. Outside network may be, for example, the Internet or some other WAN/LAN.

Firewall 500 provides a pathway for messages from outside network 405 to reach network 450. Firewall 500 may or may not provide the only pathway for such messages. Furthermore, there may be other computing devices (not shown) in the pathway between outside network 405 and network 450 without departing from the spirit or scope of the invention. Firewall may be included on a gateway, router, switch, or other computing device or simply accessible to such devices.

Figure 5:
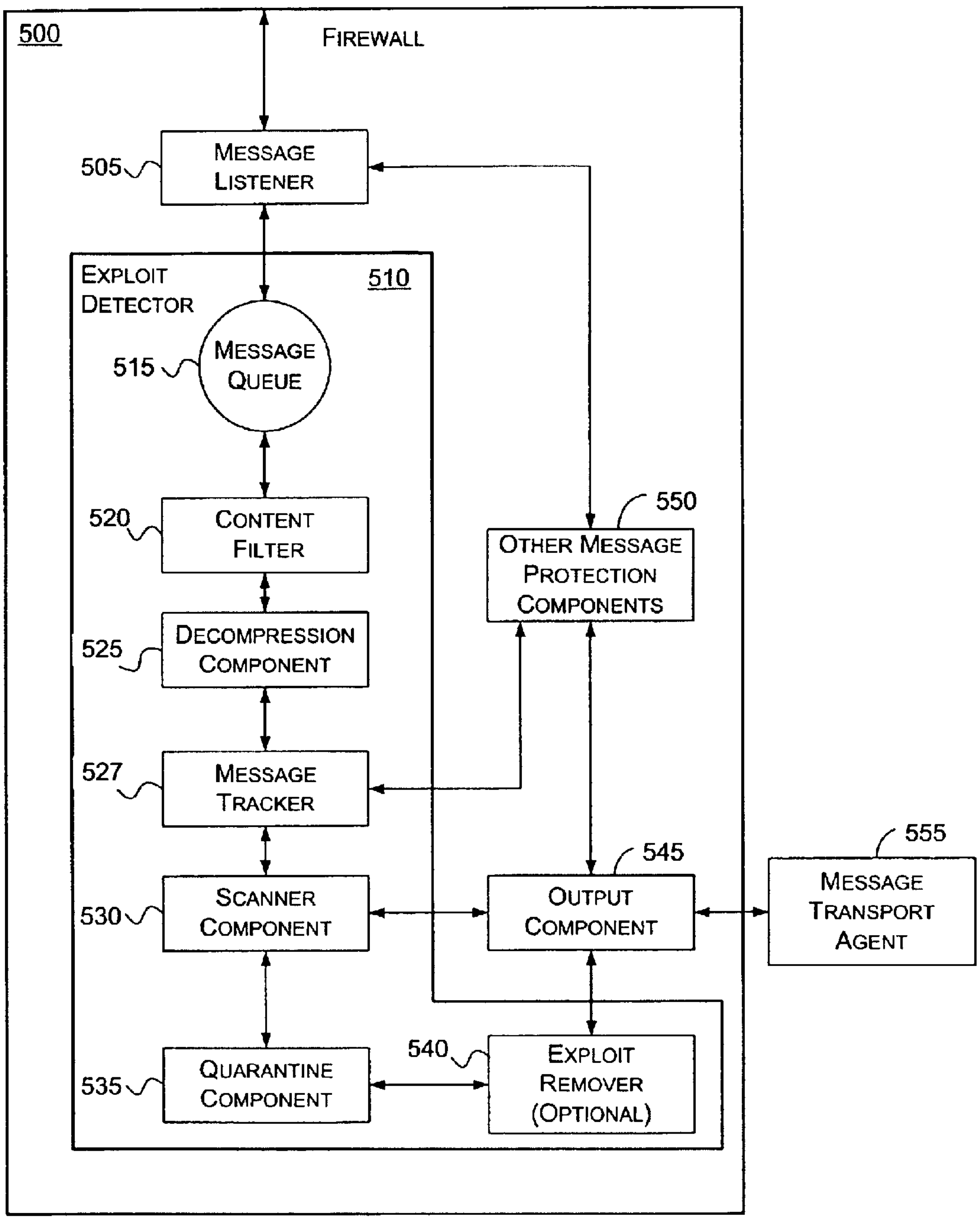
FIG. 5 illustrates components of a firewall operable to provide exploit protection.

Firewall 500 may provides exploit protection for devices coupled to network 450 by including and/or accessing an exploit detector (not shown) as described in more detail in conjunction with FIG. 5. Firewall 500 may be configured to send certain types of messages through an exploit detector. For example, firewall 500 may be configured to perform normal processing on non-email data while passing all email messages through an exploit detector.

Exemplary Exploit Detector

FIG. 5 illustrates components of a firewall operable to provide exploit protection, according to one embodiment of the invention. The components of the firewall 500 include message listener 505, exploit detector 510, output component 545, and other message protection components 550. Exploit detector 510 includes message queue 515, content filter 520, decompression component 525, message tracker 527, scanner component 530, quarantine component 535, and exploit remover 540. Also shown is message transport agent 555.

Firewall 500 may receive many types of messages sent between devices coupled to network 450 and outside network 405 of FIG. 4. Some messages may relate to WWW traffic or data transferred between two computers engaged in a communication while other messages may relate to email. Message listener 505 listens for a message and, upon receipt of an appropriate message, such as an email or file, sends the message to exploit detector 510 to scan for exploits. Some messages may be inappropriate for exploit detection. Such messages are passed by message listener 505 to other message protection components 550. In one embodiment, other message protection components 550 include other firewall components.

When processing email messages, exploit detector 510 provides exploit protection, in part, by scanning and verifying the fields of an email message. An email message typically includes a header (which may include certain fields), a body (which typically contains the text of an email), and one or more optional attachments. As described earlier, some exploits are crafted to overflow buffers in a header or body. Exploit detector 510 may examine the lengths of the fields of an email message to determine whether they are longer than they should be. Being "longer than they should be" may be defined by standards, mail server specifications, or selected by a firewall administrator. If an email message includes any fields that are longer than they should be, the message may be sent to quarantine component 535 as described in more detail below.

Exploit detector 510 may utilize exploit protection software from many vendors. For example, a client may execute on exploit detector 510 that connects to a virus protection update server. Periodically, the client may poll a server associated with each vendor and look for a flag to see if an exploit protection update is available. If there is an update available, the client may automatically retrieve the update and check it for authenticity. For example, the update may include a digital signature that incorporates a hash of the files sent. The digital signature may be verified to make sure that the files came from a trusted sender, and the hash may be used to make sure than none of the files have been modified in transit. Another process may unpack the update, stop the execution of exploit detector 510, install the update, and restart exploit detector 510.

Exploit detector 510 may be configured to poll for customized exploit protection updates created by, for example, an information technology team. This process may execute in a manner similar to the polling for vendor updates described above.

In addition to, or in lieu of polling, updates may be pushed to exploit detector 510. That is, a client may execute on exploit detector 510 that listens for updates from exploit protection update servers. To update the exploit protection executing on firewall 410, such servers may open a connection with the client and send exploit protection updates. A server sending an update may be required to authenticate itself. Furthermore, the client may check the update sent to make sure that files have not changed in transit by using a hash as described above.

The components of exploit detector 510 will now be explained. Upon receipt of a message to scan for exploits, exploit detector 510 stores the message in message queue 515. Content filter 520 processes messages from message queue 515 to determine encapsulation methods that have been applied to the message prior to its entry into the system. For example, a message may be encapsulated using Multipurpose Internet Mail Extensions (MIME), Base 64, and Uuencode. Content filter 520 may also strip out attachments from a message, such as email, to examine them more closely. A message or attachment (hereinafter each referred to as a "message") that is output from content filter 520 is then processed by decompression component 525.

Decompression component 525 determines whether a message is compressed. If the message is not compressed, the bits that make up the message are sent serially to scanner component 530. If the message is compressed, decompression component 525 may decompress the message one or more times before sending it to scanner component 530. Decompressions may be done in a nested fashion if a message has been compressed multiple times. For example, a set of files included in a message may first be zipped and then tarred using the UNIX "tar" command. After untarring a file, decompression component 525 may determine that the untarred file was previously compressed by zipping software such as WinZip. To obtain the unzipped file(s), decompression component 525 may then unzip the untarred file. There may be more than two levels of compression that decompression component 525 decompresses to obtain decompressed file(s).

Message tracker 527 receives decompressed messages and messages that were not compressed from decompression component 525. Message tracker 527 is directed to optimizing the path of a message through exploit detector 510 by minimizing scans of a previously scanned message and or its attachments. Message tracker 527 achieves this by determining whether a message or attachment has been scanned previously for exploits. Messages and attachments that message tracker 527 determine have not been scanned may be forwarded to scanner component 527. If message tracker 527 determines a message or attachment has been scanned previously, message tracker 527 is configured to forward the message or attachment to other message protection components 550. Message tracker 527 is also configured to enable scanning of a previously scanned message or attachment, if the scanner component 530 or its associated components have been updated, revised, modified, or the like.

Message tracker 527 may determine whether a message or attachment has been scanned previously for exploits by associating a separate value with the message and each attachment. Each value may be determined based on a hash function, such as Message Digest-5 (MD-5), Secure Hash Algorithm (SHA), Secure Hash Standard, and the like. The values may also be determined based on a public key certificate, a digital signature, a checksum function, or similar algorithmic mechanism that provides a value that distinguishes one message or attachment from another message or attachment.

Message tracker 527 is also enabled to save the values with sufficient information to associate the message or attachment to the value. The values may be stored in a list, database, file, table, or the like. Moreover, the values may be stored locally or in a distributed manner.

Scanner component 530 receives messages and attachments from message tracker 527. Scanner component 530 includes software that scans the message for exploits. Scanner component 530 may scan messages using exploit protection software from many vendors. For example, scanner component 530 may pass a message through software from virus protection software vendors such as Trend Micro, Norton, MacAfee, Network Associates, Inc., Kaspersky Lab, Sophos, and the like. In addition, scanner component 530 may apply proprietary or user-defined algorithms to the message to scan for exploits. For example, a user-defined algorithm testing for buffer overflows may be used to detect exploits.

Scanner component 530 may also include an internal mechanism that creates digital signatures for messages and content that an administrator wants to prevent from being distributed outside a network. For example, referring to FIG. 4, a user on one of the computing devices may create a message or try to forward a message that is confidential to outside network 405. Scanner component 530 may examine each message it receives (including outbound messages) for such digital signatures. When a digital signature is found that indicates that the message should not be forwarded, scanner component 530 may forward the message to quarantine component together with information as to who sent the message, the time the message was sent, and other data related to the message.

When a message is determined to have an exploit, the message is sent to quarantine component 535. Quarantine component 535 may store messages that contain exploits for further examination by, for example, a network administrator. In addition, quarantine component 535 may send an infected message to exploit remover 540 to remove an exploit.

When scanner component 530 does not find an exploit in a message, the message may be forwarded to output component 545. Output component 545 forwards a message towards its recipient. Output component 545 may be hardware and/or software operative to forward messages over a network. For example, output component 545 may include a network interface such as network interface unit 310.

Exploit remover 540 may remove exploits from a message. Some exploits may be removed from a message after detection yielding a cleaned message. The cleaned message, now free from exploits, may then be forwarded to its intended recipient. After cleaning a message, exploit remover may forward the message to output component 545. If exploit remover cannot remove an exploit, it may send the message back to quarantine component 535.

A firewall may perform other tasks besides passing messages to an exploit detector. For example, a firewall may block messages to or from certain addresses. Such other tasks may be accomplished by other message protection components 550. When other message protection components 550 determines that a message should be passed through firewall 500, other message protection components 550 forwards the message to output component 545.

Message transport agent 555 is a computing device that receives email. Email receiving devices include mail servers. Examples of mail servers include Microsoft Exchange, Q Mail, Lotus Notes, etc. Referring to FIG. 4, firewall 500 may forward a message to mail server 430.

Illustrative Method of Scanning for Exploits

Figure 6:
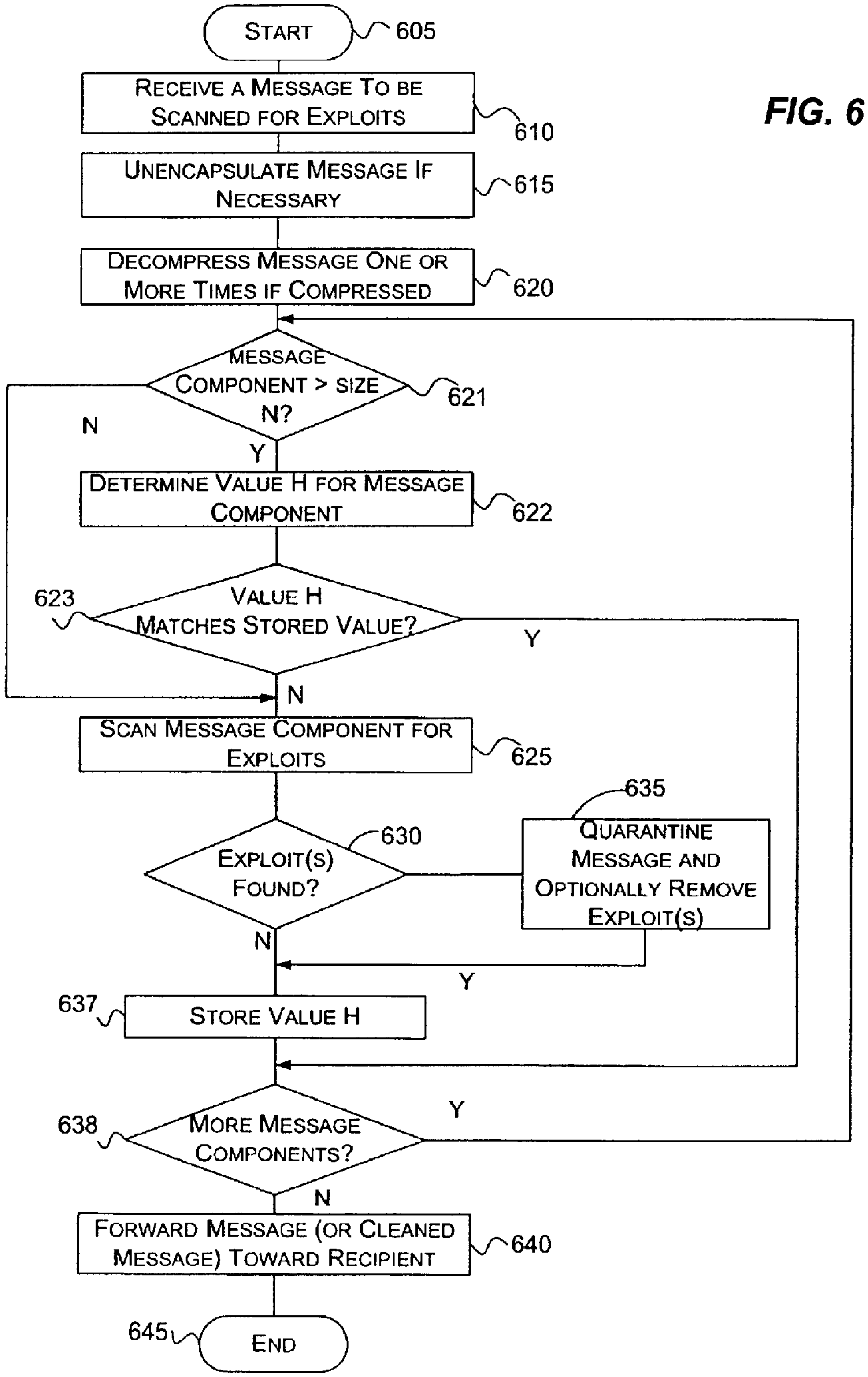
FIG. 6 illustrates a flow chart for detecting exploits in accordance with the invention.

FIG. 6 illustrates a flow chart for detecting exploits, according to one embodiment of the invention. The process begins at block 605 when a listener, such as message listener 505 of FIG. 5, is ready to receive a message.

At block 610, the message is received by a listener. The listener determines whether the message should be scanned for exploits. If the message is to be scanned for exploits, processing continues at block 615; otherwise other processing (not shown) may be performed on the message. For example, referring to FIG. 5, a message including an email message is received by message listener 505. Message listener 505 determines that the message should be scanned for exploits and sends the message to message queue 515.

At block 615 the message is unencapsulated, if necessary. A message may be encapsulated in many ways, including MIME, Base 64, and uuencode. To retrieve the message, the message may be unencapsulated. For example, referring to FIG. 5, the email message may include an attachment that is encoded using MIME. Content filter 520 may unencapsulate the attachment. After block 615, processing continues at block 620.

At block 620, the message and/or its attachment, if any, may be decompressed one or more times. For example, referring to FIG. 5, an email message may include an attachment that has been compressed by WinZip. Decompression component 525 may determine the compression algorithm used and then decompress the attachment. After block 620, processing continues at decision block 621.

At decision block 621, a determination is made whether a message component exceed a pre-determined size, N. A message component includes the message body, headers, any attachment, or file within an archive, such as a ZIP, TAR, and the like. The pre-determined size may be based on a size that balances the efficiency, cost, and the like of scanning for an exploit over a risk that a previously scanned message or attachment may include an exploit. In one embodiment, N is about 100 Kbytes. If the message components' sizes exceed the pre-determined size N, processing proceeds to block 622. Otherwise, processing flows to block 625.

At block 622, an H value is determined for the message component. H values may be determined from any hash function, including a Message Digest-5 (MD-5), Secure Hash Algorithm (SHA), Secure Hash Standard, and the like. The present invention however, is not limited to hash values. For example, H values may also be determined for each message and attachment based on a public key certificate, a digital signature, a checksum function, or similar algorithmic mechanism that provides a value that distinguishes one message or message component from another message or message component.

Moreover, at block 622, a determination is made whether the exploit protection or associated applications have been recently updated. If the exploit protection or its associated applications have been recently updated, any stored H values are set to a nullity. The process continues next to decision block 623.

At decision block 623, a determination is made whether any of the H values from block 622 substantially matches a stored value associated with the message component. The stored value may be stored in a table, database, list, file, or the like, based on a previously scanned message component. If it is determined that any H value substantially matches the stored value associated with the message component, processing continues at block 638, where a determination is made whether more message components exist for the current message. Alternatively, processing continues at block 625.

At block 625, a message is scanned for exploits. The message may be scanned using conventional exploit detection software and/or proprietary or user-defined exploit detection software. For example, referring to FIG. 5, the header, body, and attachment fields of a message may be scanned to determine if they are less than or equal to the maximum length of such fields. In addition, the attachments of an email message, if any, may be passed through virus detection software from various vendors to determine if they include any exploits. After block 625, processing continues at block 630.

At block 630, a determination is made as to whether the scan detected any exploits. If exploits are found, processing continues at block 635; otherwise processing continues at block 637.

At block 635, a message is quarantined and optionally one or more exploits are removed. Quarantined may mean that the message is stored together with other information regarding the message, such as who sent the message, to whom it was addressed, and when the message arrived. This may be done for further examination or analysis. Alternatively, quarantined may mean that the message is discarded. When exploits are removed from a message processing, may continue at block 637; otherwise, processing finishes for a particular message and another message may be scanned for exploits. For example, referring to FIG. 5, quarantine component receives an email including exploits and stores the email for further examination.

At block 637, the H value determined for each message component is stored, along with sufficient information to associate the stored value to the message or attachment. Upon storing the H value and associated information, processing continues at decision block 638.

At decision block 638, a determination is made whether the current message includes more message components to be examined. If the current message includes more message components to be examined, the process returns to decision block 621, described above, otherwise, the process continues at block 640.

At block 640, the message is forwarded towards its recipient. The message may be an original message received by an exploit detector or may be a message from which exploits have been removed. For example, referring to FIG. 5, output component 545 forwards a message to message transport agent 555.

At block 645, processing ends. At this point a message has been scanned for exploits. If any part of the message has been encapsulated, the message has been unencapsulated. If the message was compressed one or more time, the message has been decompressed one or more times. A scan for exploits has occurred on the message. If exploits are found, the entire message and associated components are quarantined and/or optionally are removed from the message. The message or cleaned message is then been forwarded towards the recipient. The process outlined above may be repeated for each message received.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for providing protection from an exploit to a device connected to a network, comprising:

- a content filter that receives a message that is directed to the device;
- a message tracker that is coupled to the content filter and is configured to perform actions, including:
  - determining a size of a message component associated with the message;
  - if the size is less than or equal to a pre-determined size; identifying the message as unscanned;
  - if the size exceeds the pre-determined size, then:
    - determining a first value associated with the message, and if the first value is the same as a stored second value associated with the message, identifying the message as a scanned message;
  - if the size exceeds the pre-determined size, then:
    - determining the first value associated with the message, and if the first value is different from the stored second value, identifying the message as unscanned; and
- a scanner component that is coupled to the message tracker and that is configured to receive the unscanned message and to determine whether at least one element of the message includes an exploit.

2. The system of claim 1, wherein an element of the message is at least one of a header, body, and an attachment.

3. The system of claim 1, wherein the message component further comprises at least one of a message body, a message header, an attachment, and a file within an archive.

4. The system of claim 1, wherein the second value is stored in at least one of a table, database, and a list.

5. The system of claim 1, wherein the message tracker is further configured to set the second value to a nullity when the scanner component is updated.

6. The system of claim 1, wherein at least one of the first value and the second value further comprises at least one of a hash value, an algorithmic function, checksum, public key certificate, and a digital signature.

7. The system of claim 1, wherein the first value and the second value each further comprises a separate value for the message and a separate value for an attachment.

8. The system of claim 1, wherein the system is operable on at least one of a firewall, a router, a switch, a server, and a dedicated platform.

9. A method for providing protection from an exploit to a device connected to a network, comprising:

- receiving a message that is directed to the device;
- determining a size of a message component associated with the message;
- if the size is less than or equal to a pre-determined size; identifying the message as unscanned;
- if the size exceeds the pre-determined size, then:
  - determining a first value associated with the message, and if the first value is the same as a stored second value associated with the message, identifying the message as a scanned message;
- if the size exceeds the pre-determined size, then:
  - determining the first value associated with the message, and if the first value is different from the stored second value, identifying the message as unscanned; and
- if the message is an unscanned message, performing actions, including:
  - i. determining whether at least one element of the message includes an exploit; and
  - ii. if at least one element of the message includes the exploit, quarantining the message.

10. The method of claim 9, wherein an element of the message is at least on of a header, body, and an attachment.

11. The method of claim 9, wherein the second value is stored in at least one of a table, database, and a list.

12. The method of claim 9, wherein the second value is set to a nullity based on a pre-determined condition.

13. The method of claim 9, wherein at least one of the first value, and the second value further comprises at least one of a hash value, an algorithmic function, checksum, public key certificate, and a digital signature.

14. The method of claim 9, wherein the first value and the second value each further comprises a separate value for the message and a separate value for the attachment.

15. The method of claim 9, further comprising:

- if the size exceeds the pre-determined size;
  - determining whether at least one of the header and the body includes the exploit; and
  - if at least one of the header, body, and attachment of the message includes the exploit, quarantining the message.

16. The method of claim 9, wherein the method is operable on at least one of a firewall, a router, a switch, a server, and a dedicated platform.

17. A system for providing protection from an exploit to a device connected to a network, comprising:

means for receiving a message that includes a header and at least one of a body and an attachment;

a means for determining a size of a message component associated with the message;

a means for identifying the message as unscanned, if the size is less than or equal to a pre-determined size;

if the size exceeds the pre-determined size, then:

employing a means for determining a first value associated with the message, and if the first value is the same as a stored second value associated with the message, employing a means for identifying the message as a scanned message;

if the size exceeds the pre-determined size, then:

employing a means for determining the first value associated with the message, and if the first value is different from the stored second value, employing the means for identifying the message as unscanned; and means for determining whether at least one of the header, attachment, and the body includes an exploit in the unscanned message.

* * * * *